(12) United States Patent
Sinha

(10) Patent No.: US 10,157,344 B2
(45) Date of Patent: Dec. 18, 2018

(54) SYSTEMS AND METHODS FOR TREND AWARE SELF-CORRECTING ENTITY RELATIONSHIP EXTRACTION

(71) Applicant: eBay Inc., San Jose, CA (US)

(72) Inventor: Ayon Sinha, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 31 days.

(21) Appl. No.: 15/150,954

(22) Filed: May 10, 2016

(65) Prior Publication Data

US 2016/0253592 A1 Sep. 1, 2016

Related U.S. Application Data

(63) Continuation of application No. 14/831,069, filed on Aug. 20, 2015, now Pat. No. 9,342,791, which is a
(Continued)

(51) Int. Cl.
*G06N 5/04* (2006.01)
*G06Q 30/02* (2012.01)
(Continued)

(52) U.S. Cl.
CPC ......... *G06N 5/04* (2013.01); *G06F 17/30867* (2013.01); *G06N 5/02* (2013.01);
(Continued)

(58) Field of Classification Search
None
See application file for complete search history.

(56) References Cited

U.S. PATENT DOCUMENTS 7,827,055 B1 11/2010 Snodgrass et al.
8,326,658 B1 12/2012 Lee et al.
(Continued)

OTHER PUBLICATIONS

"U.S. Appl. No. 13/070,166, Ex Parte Quayle Action dated Feb. 1, 2013", 5 pgs.
(Continued)

*Primary Examiner* — Alan Chen
(74) *Attorney, Agent, or Firm* — Shook, Hardy & Bacon L.L.P.

(57) ABSTRACT

Methods and systems for trend aware self-correcting entity relationship extraction are disclosed. For example, a method can include receiving a selected entity, determining a plurality of entities related to the selected entity, determining a plurality of most probable entities, calculating relevance scores, and displaying a subset of the plurality of most probable entities. The selected entity can be received on a network-based transaction system. The plurality of entities related to the selected entity can be determined based on a relationship score. The relationship score can represent navigation transitions, aggregated over time, between the selected entity and each of the plurality of entities. The plurality of most probable entities can be determined based on probabilities. Relevance scores can be calculated for each of the plurality of most probable entities. Finally, the subset of the plurality of most probable entities to be displayed can be determined according to the relevance scores.

20 Claims, 18 Drawing Sheets

Related U.S. Application Data continuation of application No. 14/486,277, filed on Sep. 15, 2014, now Pat. No. 9,129,212, which is a continuation of application No. 13/969,211, filed on Aug. 16, 2013, now Pat. No. 8,838,521, which is a continuation of application No. 13/070,166, filed on Mar. 23, 2011, now Pat. No. 8,515,889.

(60) Provisional application No. 61/316,768, filed on Mar. 23, 2010.

(51) Int. Cl.
  *G06Q 30/06* (2012.01)
  *G06Q 50/00* (2012.01)
  *G06F 17/30* (2006.01)
  *G06N 5/02* (2006.01)
  *G06N 7/00* (2006.01)
  *G06N 99/00* (2010.01)

(52) U.S. Cl.
  CPC ........... *G06N 7/005* (2013.01); *G06N 99/005* (2013.01); *G06Q 30/02* (2013.01); *G06Q 30/0201* (2013.01); *G06Q 30/0631* (2013.01); *G06Q 50/01* (2013.01)

(56) References Cited

U.S. PATENT DOCUMENTS

| | | |
|---|---|---|
| 8,515,889 B2 | 8/2013 | Sinha |
| 8,838,521 B2 | 9/2014 | Sinha |
| 9,129,212 B2 | 9/2015 | Sinha |
| 9,342,791 B2 | 5/2016 | Sinha |
| 2003/0212760 A1* | 11/2003 | Chen ............... G06F 17/18 709/218 |
| 2005/0108322 A1* | 5/2005 | Kline ............... G06F 17/30902 709/203 |
| 2010/0100416 A1 | 4/2010 | Herbrich et al. |
| 2010/0241647 A1 | 9/2010 | Ntoulas et al. |
| 2010/0250336 A1 | 9/2010 | Selinger et al. |
| 2011/0010324 A1 | 1/2011 | Bolivar et al. |
| 2011/0035403 A1 | 2/2011 | Ismalon |
| 2011/0238615 A1 | 9/2011 | Sinha |
| 2013/0282710 A1 | 10/2013 | Raghavan et al. |
| 2013/0339289 A1 | 12/2013 | Sinha |
| 2015/0006464 A1 | 1/2015 | Sinha |
| 2015/0356194 A1 | 12/2015 | Sinha |
| 2016/0188182 A1* | 6/2016 | Burkard ............ G06F 17/30864 715/760 |

OTHER PUBLICATIONS

"U.S. Appl. No. 13/070,166, Notice of Allowance dated Apr. 15, 2013", 6 pgs.

"U.S. Appl. No. 13/070,166, Response filed Apr. 1, 2013 to Ex Parte Quayle Action dated Feb. 1, 2013", 9 pgs.

"U.S. Appl. No. 13/969,211, Final Office Action dated Feb. 7, 2014", 10 pgs.

"U.S. Appl. No. 13/969,211, Non Final Office Action dated Sep. 30, 2013", 5 pgs.

"U.S. Appl. No. 13/969,211, Notice of Allowance dated May 16, 2014", 6 pgs.

"U.S. Appl. No. 13/969,211, Response filed May 7, 2014 to Final Office Action dated Feb. 7, 2014", 9 pgs.

"U.S. Appl. No. 13/969,211, Response filed Dec. 30, 2013 to Non Final Office Action dated Sep. 30, 2013", 8 pgs.

"U.S. Appl. No. 14/486,277, Examiner Interview Summary dated Feb. 24, 2015", 3 pgs.

"U.S. Appl. No. 14/486,277, Non Final Office Action dated Dec. 18, 2014", 7 pgs.

"U.S. Appl. No. 14/486,277, Notice of Allowance dated May 4, 2015", 5 pgs.

"U.S. Appl. No. 14/486,277, Preliminary Amendment filed Oct. 1, 2014", 7 pgs.

"U.S. Appl. No. 14/486,277, Response filed Apr. 20, 2015 to Non Final Office Action dated Dec. 18, 2014", 9 pgs.

"U.S. Appl. No. 14/831,069, Examiner Interview Summary dated Dec. 9, 2015", 3 pgs.

"U.S. Appl. No. 14/831,069, Non Final Office Action dated Oct. 8, 2015", 8 pgs.

"U.S. Appl. No. 14/831,069, Notice of Allowance dated Jan. 21, 2016", 7 pgs.

"U.S. Appl. No. 14/831,069, Preliminary Amendment filed Sep. 2, 2015", 6 pgs.

"U.S. Appl. No. 14/831,069, Response filed Dec. 14, 2015 to Non Final Office Action dated Oct. 8, 2015", 10 pgs.

* cited by examiner

| High Edge Strength Examples ||||| 
|---|---|---|---|---|
| ENTITY ID | PROBABILITY | EDGE STRENGTH | DEVIATION | ENTITY TITLE |
| ID 72470662 | 0.20798 | 605 | 0.20228 | Apple iPod touch 2nd GBneration (8 Gb) Mp3 Player |
| ID 77775865 | 0.18322 | 533 | 0.17753 | Apple iPod touch 3rd GBneration (32 Gb) Mp3 Player |
| ID 66283763 | 0.12822 | 373 | 0.12253 | Apple iPod Video 5th GBneration Black (30 Gb) Mp3 Player |
| ID 77767691 | 0.11035 | 321 | 0.10465 | Apple iPod nano 5th GBneration Black (8 Gb) Mp3 Player |
| ID 79640820 | 0.06016 | 175 | 0.05446 | Apple iPod touch 1st Leneration (8 Gb) Mp3 Player |
| ID 70653503 | 0.04510 | 883 | 0.03940 | |
| ID 70658558 | 0.04331 | 126 | 0.03762 | Apple iPod touch 16 Gb (2nd GBneration) Mp3 Player |
| ID 66045715 | 0.03442 | 674 | 0.02873 | |
| ID 61205801 | 0.02269 | 66 | 0.01699 | Apple iPhone 8 Gb (AT&T) |
| ID 79583828 | 0.02097 | 61 | 0.01527 | Apple iPhone 3G 8 GB Black (Unlocked) |
| ID 62598993 | 0.02079 | 407 | 0.01509 | |
| ID 71354345 | 0.01925 | 56 | 0.01355 | Apple iPhone 3G 8 GB Black (AT&T) |
| ID 77767721 | 0.01478 | 43 | 0.00909 | Apple iPod touch 3rd GBneration (64 GB) MP3 Player |
| ID 80116066 | 0.01375 | 40 | 0.00805 | Google Nexus One (Unlocked) |
| ID 56333153 | 0.01306 | 38 | 0.00737 | Nintendo Wii |
| ID 78837268 | 0.00997 | 29 | 0.00427 | BlackBerry Storm 9530 (Verizon Wireless) |

*FIG. 8*

| Low Edge Strength Example ||||||
| --- | --- | --- | --- | --- |
| ENTITY ID | PROBABILITY | EDGE STRENGTH | DEVIATION | ENTITY TITLE |
| ID 63810810 | 0.42529 | 74 | 0.37847 | Amazon Kindle |
| ID 73401020 | 0.22989 | 40 | 0.18307 | Amazon Kindle DX |
| ID 70438591 | 0.02992 | 14 | 0.01689 | Sony PRS-505/RC |
| ID 80056735 | 0.02299 | 4 | 0.02383 | Barne. & Noble Nook |
| ID 72470662 | 0.01724 | 3 | 0.02957 | Apple iPod touch 2nd Generation (8 GB):MP3 Player |
| ID 43548727 | 0.01724 | 3 | 0.02957 | Dell X50 |
| ID 77528929 | 0.01069 | 5 | 0.03613 | Sony PRS-600 |
| ID 64292780 | 0.01069 | 5 | 0.03613 | Uncharted 2: Among Thieves (Playstation 3, 2009) |
| ID 63284110 | 0.01069 | 5 | 0.03613 | Sony PRS-505/LC |
| ID 51287027 | 0.01033 | 4 | 0.03648 | Sony PRS-500 |
| ID 53575576 | 0.00855 | 4 | 0.03827 | Respectful Parents, Respectful Kids by Sura Hart, Victoria Paperback |
| ID 77442368 | 0.00641 | 3 | 0.04040 | Apple iPod classic 6th Generation Silver (80 Gb) MP3 Player |
| ID 46552904 | 0.00641 | 3 | 0.04040 | Angle - Season 1-4 Megapack (DVD, 2005) |

*FIG. 9*

SYSTEMS AND METHODS FOR TREND AWARE SELF-CORRECTING ENTITY RELATIONSHIP EXTRACTION

PRIORITY

This application is a Continuation of and claims the benefit of priority to U.S. patent application Ser. No. 14/831,069, filed Aug. 20, 2015, which is a Continuation of and claims the benefit of priority to U.S. patent application Ser. No. 14/486,277, filed on Sep. 15, 2014, which is Continuation of and claims the benefit of priority to U.S. patent application Ser. No. 13/969,211, filed on Aug. 16, 2013, which is a Continuation of and claims the benefit of priority to U.S. patent application Ser. No. 13/070,166, filed on Mar. 23, 2011, which is a non-provisional of U.S. Provisional Patent Application No. 61/316,768, filed on Mar. 23, 2010, which applications are hereby incorporated by reference in their entirety.

TECHNICAL FIELD

This application relates generally to data processing within a network-based publishing system operating over a distributed network, and more specifically to systems and methods for making recommendations based on trend aware self-correcting entity relationship extraction.

BACKGROUND

The explosion of information available over network-based systems, such as the internet can overwhelm a person attempting to locate a desired piece of information or product. For example, over the last decade the categories of products available through a typical network-based commerce system has grown exponentially. This dramatic growth has left users with the problem of sorting and browsing through enormous amounts of data to find information or products relevant to their needs. Recommendation systems have been implemented to attempt to assist users in locating relevant information or products. A successful recommendation system on a network-based publishing or commerce site not only saves users time in locating relevant information (e.g., products) but can also drive extra profits through advertising or additional sales revenue.

Most current recommendation systems use some form of collaborative filtering to produce a single scalar number for each potential relationship. Two different basic types of collaborative filtering are typically employed by recommendation systems, user-based or item-based. User-based collaborative filtering focuses on grouping like user behavior. Item-based recommendation systems focus on grouping similar items. Item-based recommendations using collaborative filtering is used by commerce sites to provide recommendations based on the purchase history of users that bought similar products (e.g., users who brought X also brought Y and Z).

BRIEF DESCRIPTION OF THE DRAWINGS

Some embodiments are illustrated by way of example and not limitation in the figures of the accompanying drawings in which:

FIG. 8 is a table illustrating an example of entity relationship data exhibiting high edge strength relationships, according to an example embodiment.

FIG. 9 is a table illustrating an example of entity relationship data exhibiting low edge strength relationships, according to an example embodiment.

DETAILED DESCRIPTION

Figure 1:
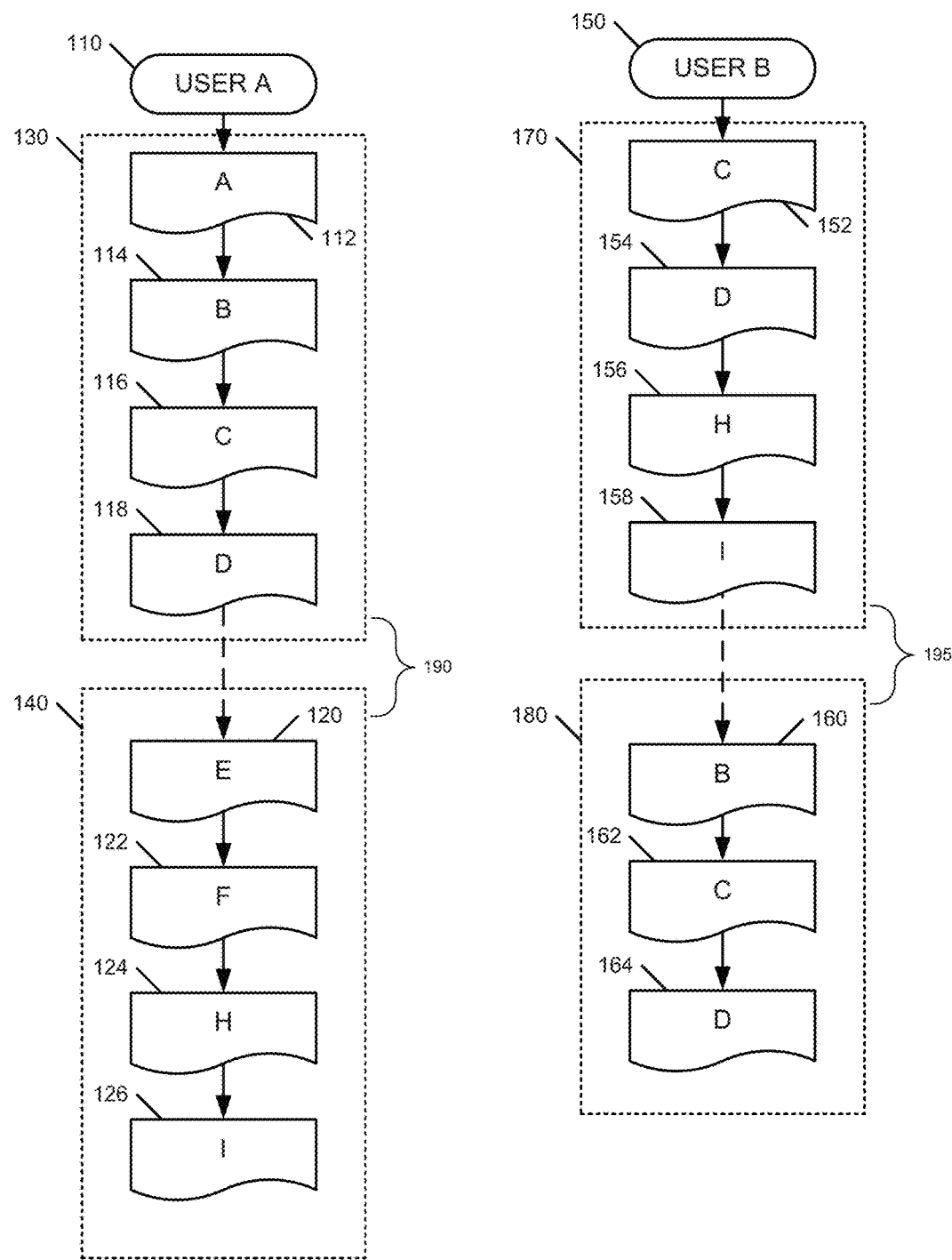
FIG. 1 is a block diagram illustrating various example entity browsing patters within a networked publication system.

Example systems and methods for trend aware self-correcting entity relationship based recommendations are described. The systems and methods for entity relationship based recommendations, in some example embodiments may provide recommendations based on the browsing behavior of a user within a network-based system, such as a network-based publication system. In the following description, for purposes of explanation, numerous specific details are set forth in order to provide a thorough understanding of example embodiments. It will be evident, however, to one skilled in the art that the present invention may be practiced without these specific details. It will also be evident; that entity relationship based recommendations are not limited to the examples provided and may include other scenarios not specifically discussed.

In accordance with an example embodiment, the system can provide recommendations that are consistent with similar browsing behavior exhibited by previous users within the network-based system. One of the potential issues plaguing standard collaborative filtering (CF) recommendation systems is the strong potential for misadvising (or providing unwanted recommendations). Standard collaborative filtering (CF) recommendation system can also be difficult to generalize across broad horizontal information, product, or service categories. The current system works solely on present and historical browsing (navigation) data to develop recommendations.

Using browsing history is not without its technical challenges. The analysis of browsing data cannot draw stabilized conclusions as easily as the analysis of purchase data. Purchase data represents a monetary exchange in which users typically act after relatively careful considerations. In contrast, navigation (browsing) behavior does not require that same amount of thoughtful consideration, which results in a greater degree of random behavior that should be taken into consideration.

Browsing or navigation data is usually only semi-structured or completely unstructured (e.g., log files, etc.). In contrast, purchase data is generally highly structured and stored within relational databases ready for analysis. These database fields containing purchase data have explicit semantics, relieving analysts of the need to make assumptions regarding user behavior. In contrast, browsing or navigation data may require further modeling prior to analysis. One such potential model is the purchase lifecycle, described in further detail within U.S. patent application Ser. No. 12/603,348, SYSTEMS AND METHODS FOR MAKING CONTEXTUAL RECOMMENDATIONS, which is hereby incorporated by reference in its entirety. The purchase lifecycle is presented as a useful model for a typical e-commerce or network-based marketplace application. Other networked systems may require another user behavior model in order to obtain improved recommendation results.

However, the current systems and methods for trend aware self-correcting entity relationship extraction does not use any purchase lifecycle characterization. The current systems and methods operate by making a statistically valid assumption that, in general, users browse network-based systems with a particular purpose in mind. For example, a user accessing an online news source, such as CNN or the New York Times, enter the site desiring a certain type of news or looking for information on a particular subject. In another example, a user accessing an online commerce site, such as eBay.com (from eBay, Inc., of San Jose Calif.), will typically be searching for a particular product or service. The product or service may be as general as an MP3 player or as specific as an Apple iPod Touch $2^{nd}$ Generation 8 GB (from Apple Computer, Inc., of Cupertino Calif.).

The trend aware self-correcting entity relationship extraction technique described below exhibits the ability to rapidly adapt to new trends. For example, within an online commerce system the relationship extraction technique can adapt to new products within days of the browsing public becoming aware of the product's availability. In an online marketplace example, the relationship extraction method can adapt and identify product or item listing relationships that the people operating the site are not even aware. It ability is particularly interesting in a marketplace environment (or any network-based publication system) that allows individual users to publish items. In this type of environment, a recommendation system that can automatically adapt to the browsing trends works to keep the system fresh and relevant to the users.

Generally, the systems and methods discussed within this specification develop relationships between entities in order to provide suggestions (recommendations) to users browsing within a network-based system. The network-based system extracts co-occurrence relationships of entities using community behavioral trends. Automatically reacting to community behavior trends, through extraction of entity to entity navigation trends, is what allows this technique to adapt over time. Based on the extracted relationships the system can generate a graph with weighted edges. The relationship data can be gathered daily and aggregated over time. In certain examples, the more current data can be weighted more heavily to properly account for trends over time towards different browsing behavior. In an example, the network-based system records navigation trails as a user moves from entity to entity within a network-based system. Within this specification an entity can represent a web page, a product, a service, or any individually addressable or accessible portion of a network-based system. For example, within a newspaper web site an entity can be an article. In another example, within an electronic commerce site, an entity can be a web page describing a product or service for sale. In yet another example, within an online classified publication system, an entity can represent an individual item listing, which could range from a personal ad to a used car ad to job posting, to name just a few.

The navigation trail (or log) can be parsed out into transitions (or edges) that indicate a user moved from entity A to entity B, and so on. FIG. 1 is a block diagram illustrating various example entity browsing patterns within a networked publication system, such as system 400 described below in reference to FIG. 4. FIG. 1 depicts user A 110 and B 150 each browsing a series of entities (112-126 and 152-164, respectively). In this example, each of the user create a series of edges (or transitions) according to their particular browsing pattern, each of the user's set of transitions is shown below in Table 1.

TABLE 1

Example Transitions (Edges)

| User A 110 | User B 150 | Summation |
|---|---|---|
| A-B = 1 | C-D = 1 | A-B = 1 |
| B-C = 1 | D-H = 1 | B-C = 2 |
| C-D = 1 | H-I = 1 | C-D = 3 |
| D-E = 1 | I-B = 1 | D-E = 1 |
| E-F = 1 | B-C = 1 | E-F = 1 |
| F-H = 1 | C-D = 1 | F-H = 1 |
| H-I = 1 | | H-I = 2 |
| | | I-B = 1 |
| | | D-H = 1 |

The transitions shown in Table 1 assume that all the browsing activity with a single session. In another example, multiple user sessions are depicted by sessions 130, 140, 170, and 180. The summation column in Table 1 illustrates how the system adds up all of the similar edges from various user navigation logs to develop edge strengths. The edge strengths can be used to graph relationships between entities, such as the graphs described below in reference to FIGS. 2A-2B.

In certain examples, the system can segment user navigation logs into individual user sessions for the purpose of creating edge counts. For example, Table 2 depicts the example edges when the browsing patterns in FIG. 1 are split into multiple sessions (130, 140, 170, and 180).

TABLE 2

Example Multi-Session Edges

| User A 110 | User B 150 | Summation |
|---|---|---|
| A-B = 1 | C-D = 1 | A-B = 1 |
| B-C = 1 | D-H = 1 | B-C = 2 |
| C-D = 1 | H-I = 1 | C-D = 3 |

TABLE 2-continued

Example Multi-Session Edges

| User A 110 | User B 150 | Summation |
| --- | --- | --- |
| E-F = 1 | B-C = 1 | E-F = 1 |
| F-H = 1 | C-D = 1 | F-H = 1 |
| H-I = 1 | | H-I = 2 |
| | | D-H = 1 |

As shown in Table 2, splitting user navigation into multiple sessions and not counting edge transition across sessions eliminates two edges, D-E and I-B, depicted in FIG. 1. Splitting navigation out into sessions can help to eliminate deviations induced by the user changing focus during a browsing session. User sessions can be determined in numerous ways, such as time-outs or total browsing time. For example, if the time period indicated by time span 190 is greater than a threshold amount of time, the system can consider session 130 and session 140 separate sessions. User session determination for the purposes of edge counting can be completely separate from user session tracking done by the network-based system.

Figure 2A:
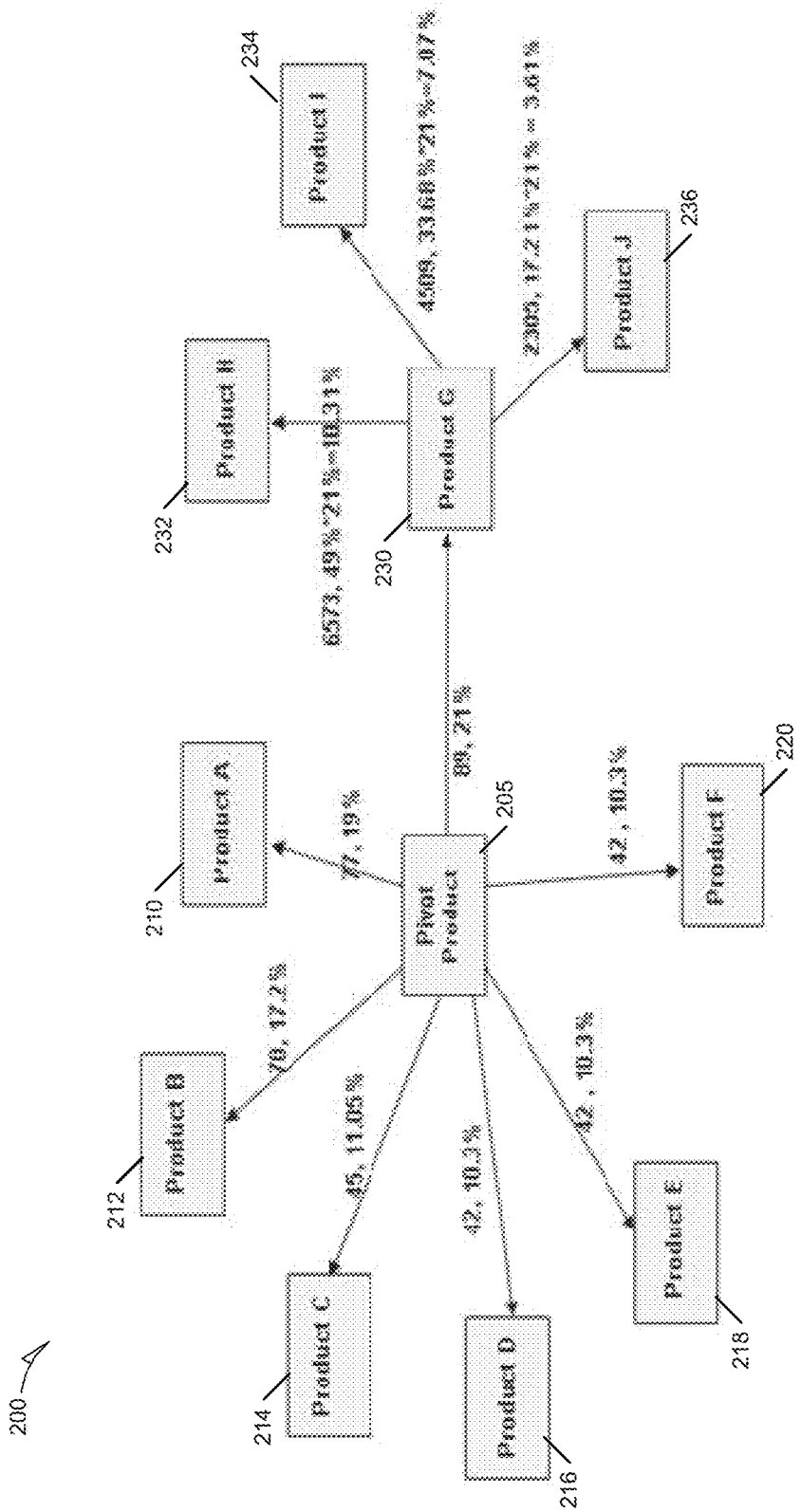
FIG. 2A is a block diagram illustrating an example entity relationship graph.

FIG. 2A is a block diagram illustrating an example entity relationship graph 200. The graph 200 includes a pivot product 205 and related products A-J (210-236). Products A-G (210-230) are directly connected to the pivot product 205. Each connection to the pivot product, such as the connection to Product A 210, includes an edge count and a probability. The calculation of probabilities is described below in reference to FIGS. 6 and 7. Product G 230 illustrates secondary connections to related products, such as products H, I, and J (232, 234, and 236, respectively). The connections to the secondary products include edge counts and probabilities in relationship to Product G 230, as well as the calculation of the probability in relationship to the Pivot Product 205. For example, Product I 234 has a 33.68% probability of being selected when a user is on Product G. To determine the probability of the user moving from the Pivot Product 205 to Product I 234, the probabilities of moving from the Pivot Product 205 to Product G 230 is multiplied by the probability of moving from Product G 230 to Product I 234 (e.g., 21%*33.68%=7.07%). As will be described in more detail below, the probabilities can be used to determine what products to display to a user as the user browses on a network-based system.

Figure 2B:
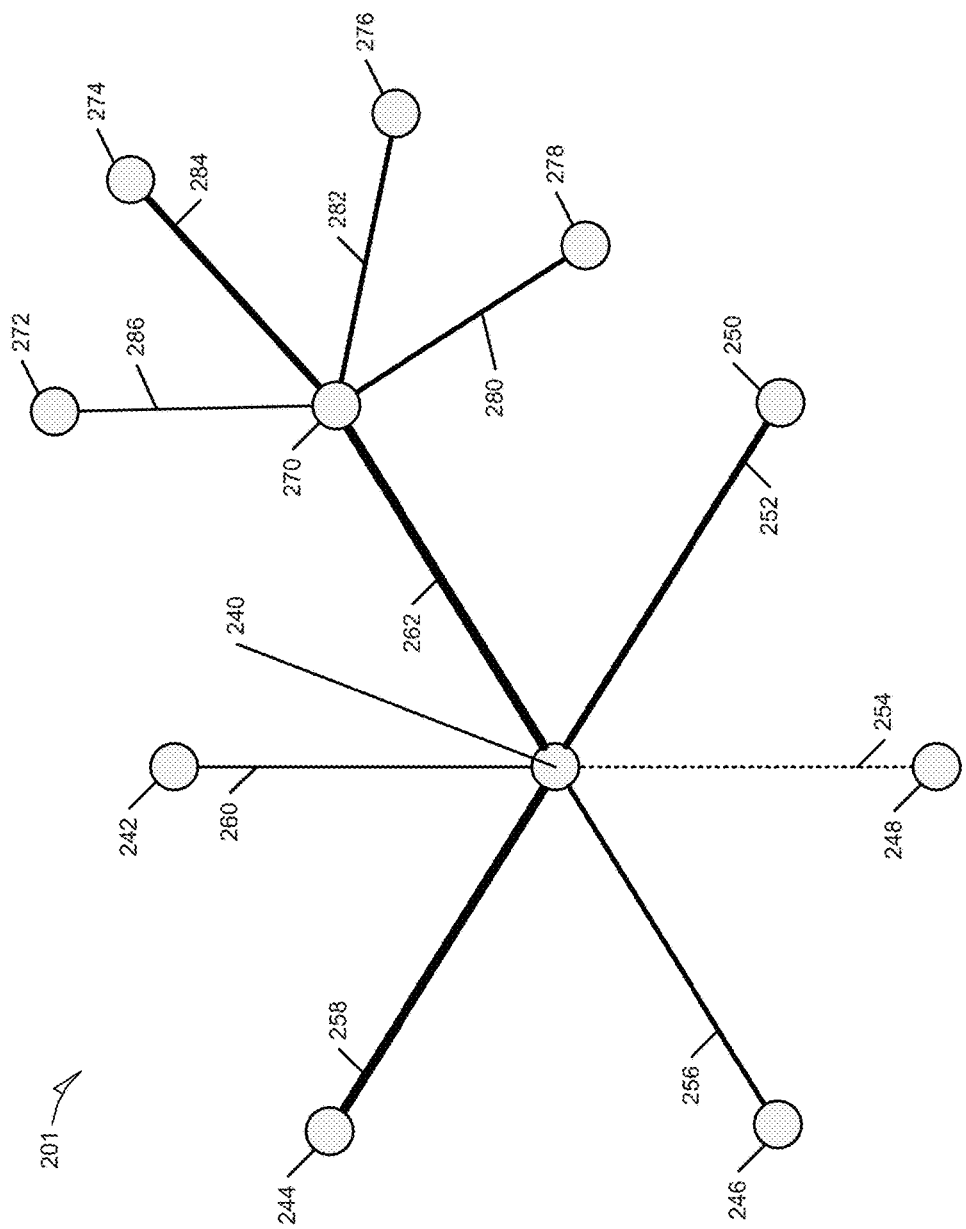
FIG. 2B is a block diagram illustrating an example entity relationship graph.

FIG. 2B is a block diagram illustrating an example entity relationship graph 201. The entity relationship graph 201 depicts similar information to that shown in graph 200. However, entity relationship graph 201 uses connection line width to depict the strength of the relationship between entities. For example, entity 240 and entity 244 are connected by a very thick line indicating a high edge count and/or high probability of a user navigating between these entities. Both graphs 200 and 201 can be used to visualize the processing being done by a network-based system to create trend aware self-correcting entity relationships. However, visually graphing the information is not necessary in order to use the entity relationships for making recommendations.

Figure 3:
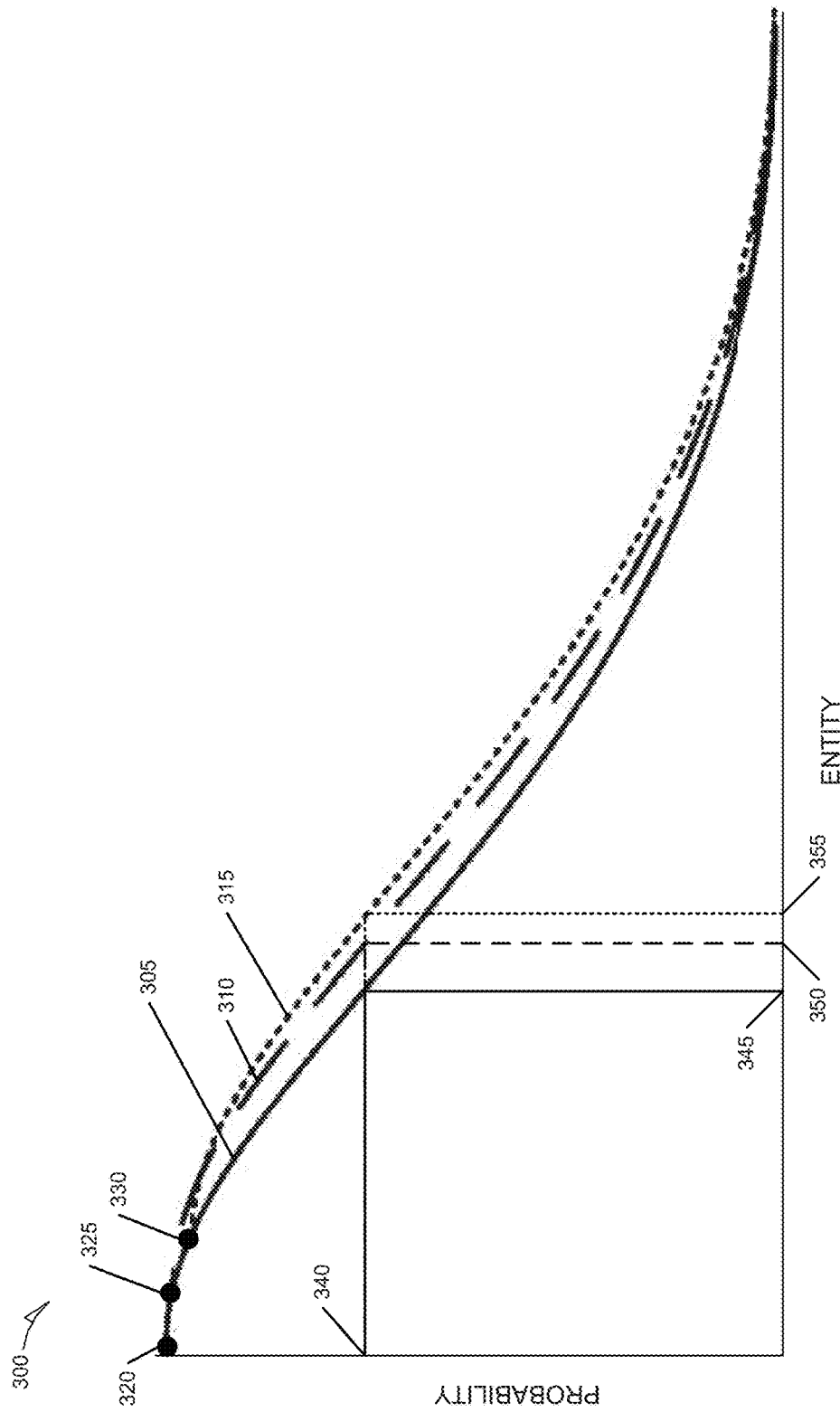
FIG. 3 is a diagram illustrating probability curves for three related entities, according to an example embodiment.

FIG. 3 is a diagram illustrating probability curves 305, 310, 315 for three related entities, according to an example embodiment. Each of the probability curves 305, 310, 315 are associated with a particular pivot entity 320, 325, 330. The probability curves 305, 310, 315 depict the probability of a user navigating from the pivot entity, for example entity 320 to another entity. In an example, the pivot entity 320 can be related to a variety of other entities in a manner depicted by the curve 305. At any given probability level, for example probability 340, all the entities to the left of 345 can be considered for recommendation. In some examples, the system can choose a number of additional closely related entities, e.g., entity 325 and entity 330, and include all entities related to these additional entities in the consideration for recommendation. As depicted within FIG. 3, adding additional closely related entities (e.g., 325, 330) can increase the number of potential entities for recommendation from 345 to 355.

Platform Architecture

Figure 4:
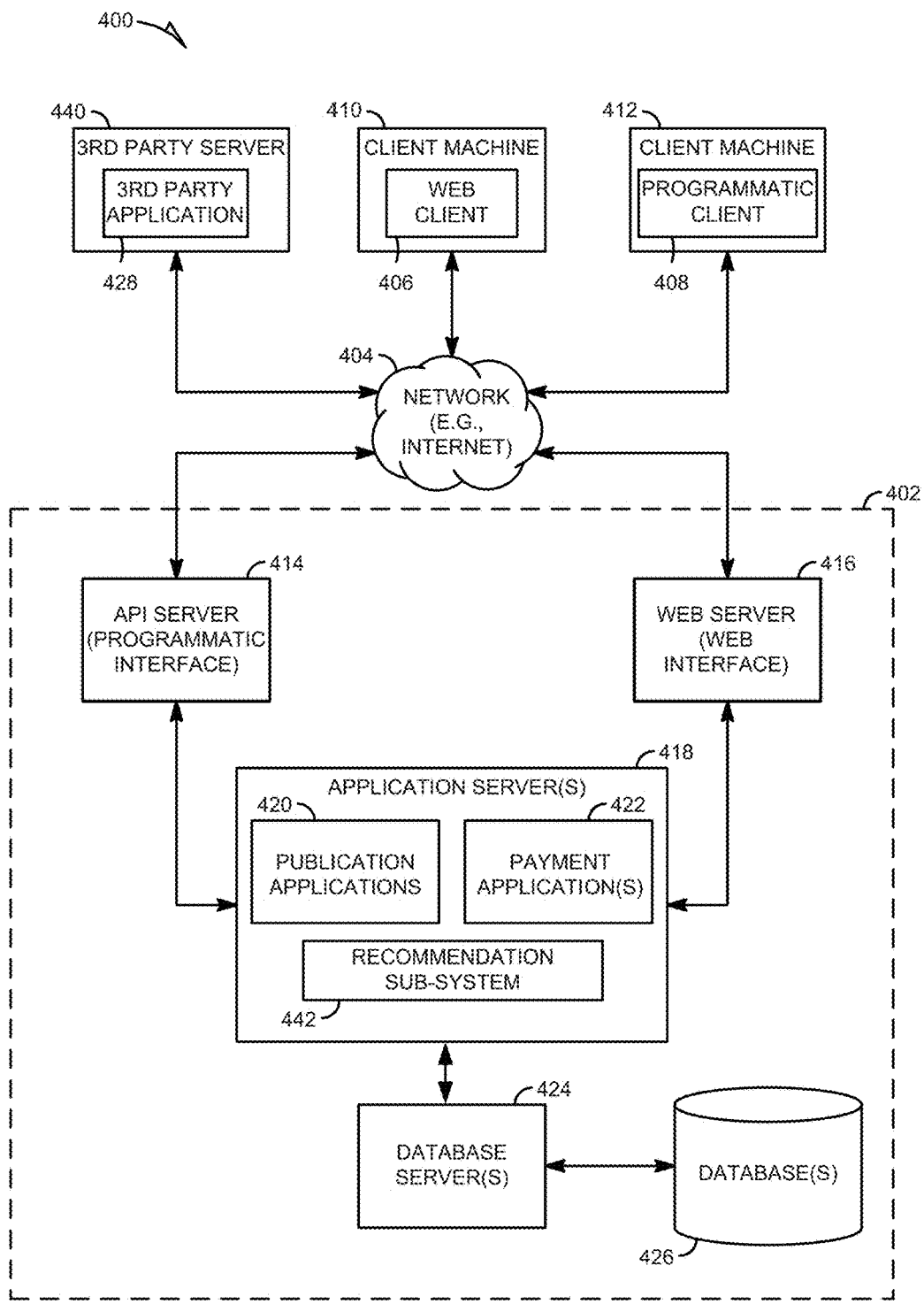
FIG. 4 is a block diagram illustrating an example online system capable of implementing trend aware self-correcting entity relationship extraction for presenting recommendations.

FIG. 4 is a block diagram illustrating an example architecture for a network-based system 400 within which systems and methods for making contextual recommendations can be implemented. The block diagram depicting a client-server system 400, within which an example embodiment can be deployed is described. A networked system 402, in the example forms of a network-based marketplace, online retail site, or publication system, provides server-side functionality, via a network 404 (e.g., the Internet or Wide Area Network (WAN)) to one or more clients 410, 412. FIG. 4 illustrates, for example, a web client 406 (e.g., a browser, such as the Internet Explorer browser developed by Microsoft Corporation of Redmond, Wash. State), and a programmatic client 408 executing on respective client machines 410 and 412.

An Application Program Interface (API) server 414 and a web server 416 are coupled to, and provide programmatic and web interfaces respectively to, one or more application servers 418. The application servers 418 host one or more publication applications 420 (in certain examples these can also include commerce application, marketplace applications, to name a few), payment applications 422, and a recommendation sub-system 432. The application servers 418 are, in turn, shown to be coupled to one or more databases servers 424 that facilitate access to one or more databases 426. In some examples, the application server 418 can access the databases 426 directly without the need for a database server 424.

The publication applications 420 may provide a number of publication functions and services to users that access the networked system 402. The payment applications 422 may likewise provide a number of payment services and functions to users. The payment applications 422 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 320. The payment application 422 may also be configured to present recommendations, generated by the recommendation modules, to a user during checkout. The recommendation sub-system 432 may provide entity relationship based recommendations to users of the networked system 402. The recommendation sub-system 432 can be configured to use all of the various communication mechanisms provided by the networked system 402 to present recommendations to users. While the publication applications 420, payment applications 422, and recommendation sub-system 432 are shown in FIG. 4 to all form part of the networked system 402, it will be appreciated that, in alternative embodiments, the payment applications 422 may form part of a payment service that is separate and distinct from the networked system 402.

Further, while the system 400 shown in FIG. 4 employs a client-server architecture, the present invention is of course not limited to such an architecture, and could equally well find application in a distributed, or peer-to-peer, architecture system, for example. The various publication applications 420, payment applications 422, and recommendation modules 432 could also be implemented as standalone software programs, which do not necessarily have networking capabilities.

The web client 406 accesses the various publication applications 420, payment applications 422, and recommendation sub-system 432 via the web interface supported by the web server 416. Similarly, the programmatic client 408 accesses the various services and functions provided by the publication applications, payment applications, and recommendation sub-system 420, 422 and 432 via the programmatic interface provided by the API server 414. The programmatic client 408 may, for example, be a seller application (e.g., the TurboLister application developed by eBay Inc., of San Jose, Calif.) to enable sellers to author and manage listings on the networked system 402 in an off-line manner, and to perform batch-mode communications between the programmatic client 408 and the networked system 402.

FIG. 4 also illustrates a third party application 428, executing on a third party server machine 430, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide user recommendations for items available on the networked system 402 through the recommendation modules 432.

Recommendation Sub-System

Figure 5:
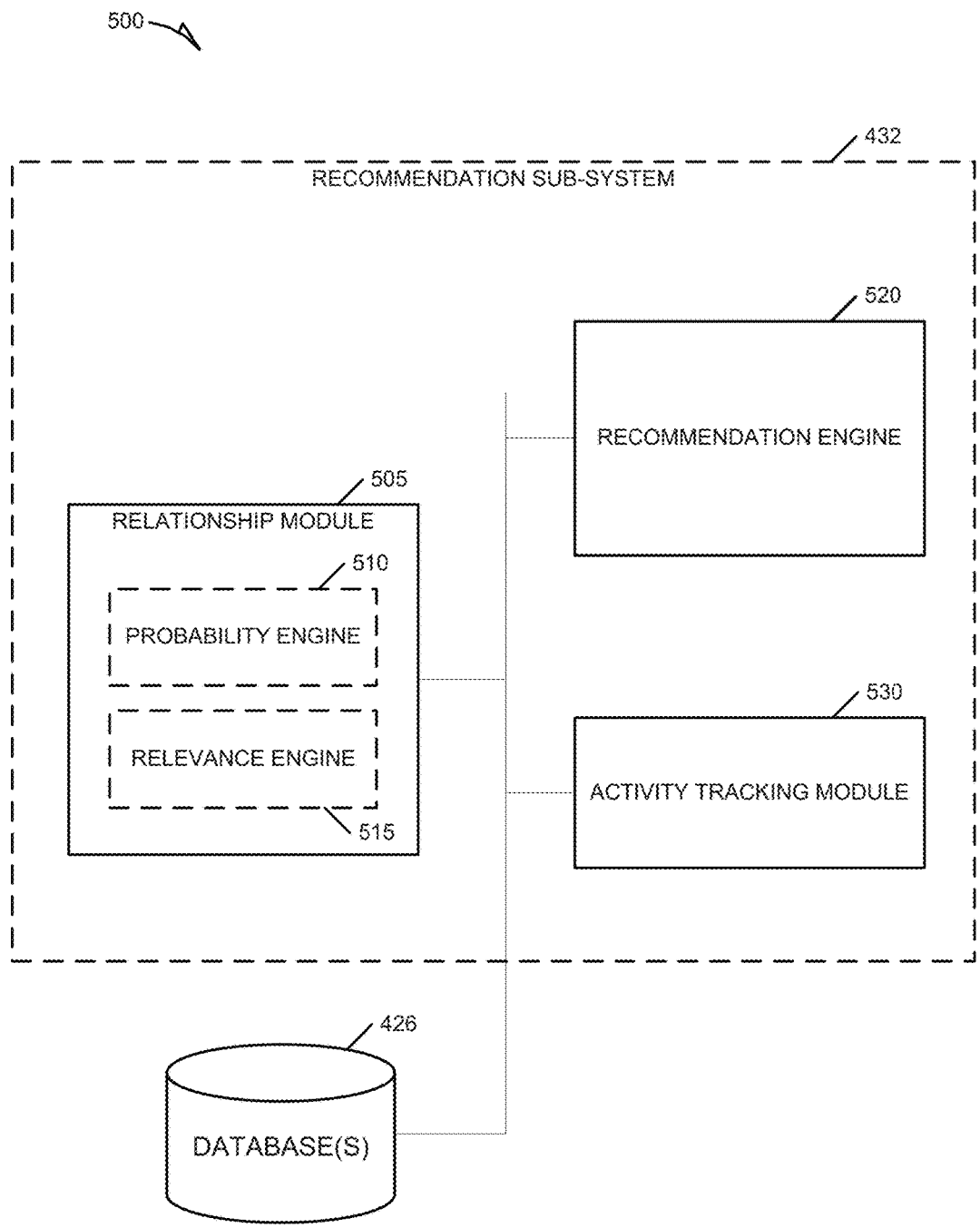
FIG. 5 is a block diagram illustrating an example recommendation sub-system capable of implementing trend aware self-correcting entity relationship extraction.

FIG. 5 is a block diagram illustrating an example recommendation sub-system 432 capable of implementing trend aware self-correcting entity relationship extraction. The system 500 can include a relationship module 505, a recommendation engine 520, an activity tracking module 530, and a database 426. In an example, the relationship module 505 can create and maintain entity relationships used by the recommendation engine 520 to present entity recommendations to a user browsing the networked system 402. The relationship module 505 can also optionally include a probability engine 510 and a relevance engine 515. In some examples, the probability engine 510 can determine the probabilities for navigating between any two entities within a system based on factors including edge (transition) strength. The relevance engine 515 can be used to determine a relevance score between any two entities within the networked system 402.

The activity tracking module 530 can be configured to track real-time user activity on the networked system 402. This real-time data can be passed to the recommendation engine 520 to detect potential recommendation opportunities. Certain user activity, such as viewing an item listing, can be detected as potential recommendation opportunities. For example, if a user selects a certain item listing to view, the recommendation engine 520 can access the relationship module 505 to determine a set of related entities that can be displayed to the user.

The recommendation engine 520 can be configured to make recommendations based on a user's current activity and the relationships between related objects. The recommendation engine 520 can access relationship data stored in the database 426 and can receive activity data from the activity tracking module 530. In some examples, the recommendation engine 520 may also communicate with the relationship module 505 as described above.

Figure 6:
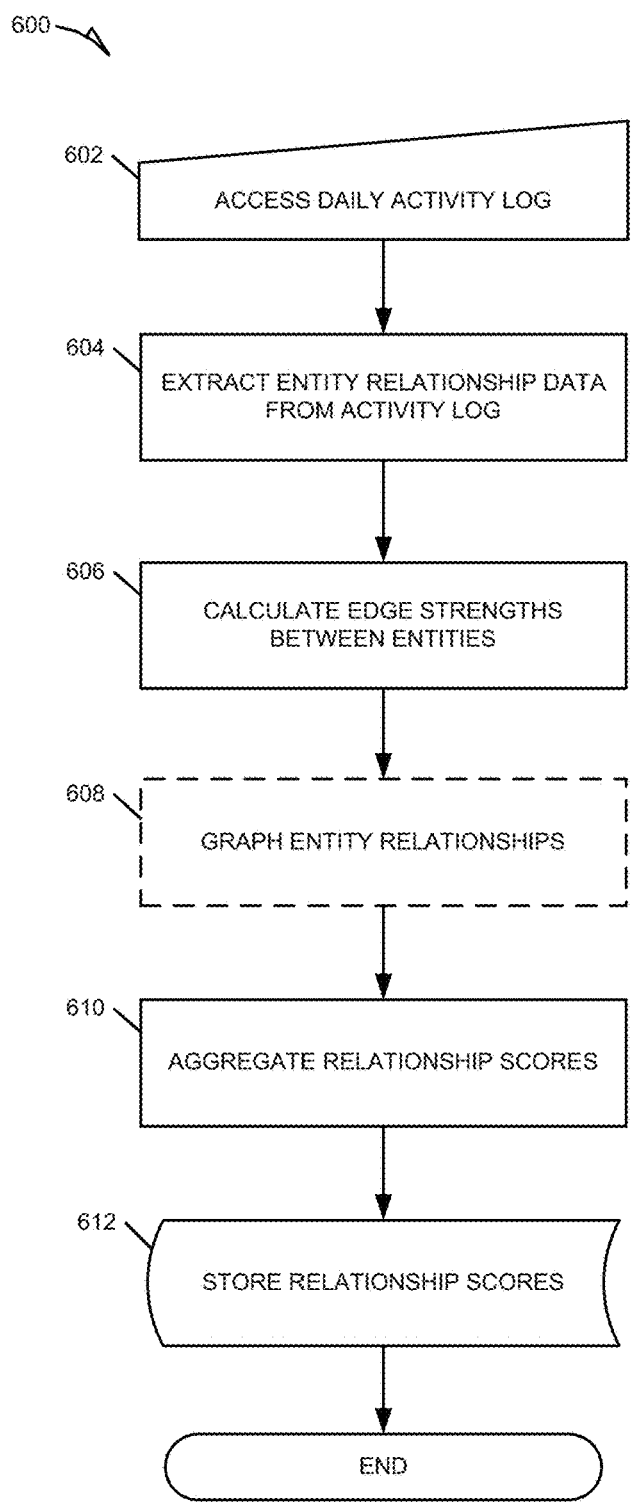
FIG. 6 is a flowchart illustrating an example method for trend aware self-correcting entity relationship extraction.
Figure 7:
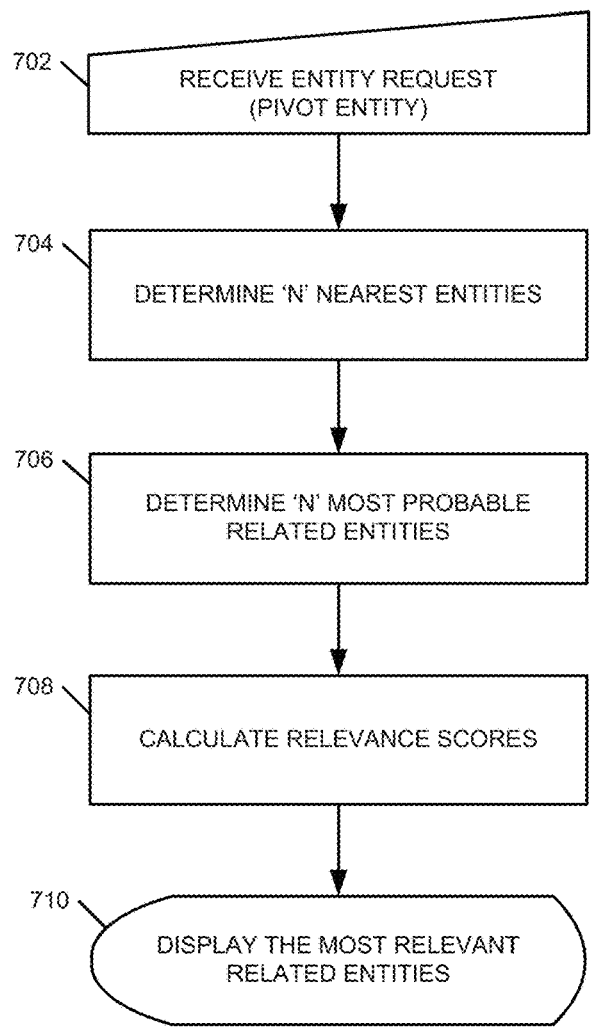
FIG. 7 is a flowchart illustrating an example method for using trend aware self-correcting entity relationships to make recommendations.

Additional details regarding the functionality provided by the recommendation sub-system 432 is detailed in reference to FIGS. 6-7.

Entity Relationship Recommendation Methods

FIG. 6 is a flow chart illustrating an example method 600 for trend aware self-correcting entity relationship extraction. In this example, the method 600 includes operations for accessing daily activity logs at 602, extracting entity relationship data from the activity logs at 604, calculating edge strengths between entities at 606, optionally graphing the entity relationships at 608, aggregating relationship scores at 610, and storing relationship scores at 612.

In this example, the method 600 begins at 602 with the recommendation sub-system 432 accessing one or more daily activity logs, which can be stored within the database 426. At 604, the method 600 can continue with the relationship module 505 extracting relationship data from the activity log. In some examples, extracting the relationship data can include determining user session boundaries. In certain examples, the extraction process at 604 can impose artificial session boundaries based on factors such as browsing time or idle time, among others. At 606, the method 600 continues with the relationship module 505 calculating edge strengths between entities. As discussed above, calculating edge strengths can include counting the number of navigation transitions between two entities.

At 608, the method 600 can optionally include graphing the edge strength data between entities. The weighted edges created in operation 606 can be visually depicted as shown in FIGS. 2A and 2B. At 610, the method 600 continues with the relationship module 505 aggregating edge strengths over time. In order to account for shifting trends, newer edge strength data can be weighted more heavily than historical data. In an example, the following equation is used to aggregate edge strengths (Aggregated ES):

$$\text{Aggregated ES} = (\text{Weighting Factor}) * (\text{Previous ES}) + \text{Current ES}$$

In certain examples, the weighting factor can be 0.5, which allows for changes in navigation trends to dominate the edge strength calculations within a couple cycles. The weighting factor can be adjusted up or down to increase or decrease the affect of the historical edge strength on the aggregated edge strength. At 612, the method 600 can conclude with the relationship module 505 storing the aggregated edge strengths into the database 426. In this example, an edge strength between entities represents a relationship score between those entities. In other examples, the relationship score between entities may include additional factors beyond the edge strengths discussed above.

FIG. 7 is a flowchart illustrating an example method 700 for using trend aware self-correcting entity relationships to make recommendations. In this example, the method 700 includes operations for receiving an entity request at 702, determining a set of 'N' nearest entities at 704, determining the 'N' most probable related entities at 706, calculating relevance scores at 708, and displaying the group of most relevant related entities at 710. The method 700 begins at 702 with the recommendation sub-system 432 receiving an entity request, which can be considered as the pivot entity.

At 704, the method 700 continues with the relationship module 505 using the pivot entity as input to determine a set of 'N' nearest entities based on edge strengths. In an example, the nearest entities are determined based on threshold edge strength. In another example, the nearest entities are determined based on a set number, such as 10 or 100 (the set number can be determined based on how many recommendations the system is programmed to return). At 706, the method 700 continues with the probability engine 510 determining the probabilities for the 'N' nearest entities. In an example, the probability engine can use the following formula to determine probability:

$$P_i = \frac{\text{Edge Strength}_i}{\sum_{N}^{x=1} \text{Edge Strength}_x}$$

Where, Edge Strength$_i$ is the Edge Strength of entity$_i$ in relation to the pivot entity. In this example, a probability is used to normalize the edge strengths. As noted above, the probability of entities which are not directly connected to the pivot product can also be included by factoring in all intervening probabilities.

At 708, the method 700 can continue with the relevance engine 515 calculating relevance scores for all 'N' entities or for only those entities with a probability above a pre-determined threshold. In certain examples, the relevance score is calculated as a function of probability and entity velocity. In other examples, relevance can be calculated as a function of probability and another facotr relating the two entities, such as entity category.

Entity velocity (EV) is a measure of an entity's directional change in popularity. For example, in a network-based commerce system entity velocity can represent the change over time in the sales volume of a particular item. In an example publication system, entity velocity can represent the change over time in how often an entity (e.g., article) is viewed. Calculating entity velocity can include calculating the difference in entity popularity between this week and last week or between any two relevant time periods (e.g., hour, day, week, month, etc. . . . ).

In an example, calculating relevance can include factoring entity velocity into the entity's probability. In an example, the relevance (R$_i$) score can be calculated with the following formula:

$$R_i = P_i * (1 + \log(EV_i))^e$$

Where R$_i$ is the relevance score for entity$_i$, EV$_i$ is the entity velocity (which, in this example, is the directional change in a measure of the popularity of entity$_i$), and e is 1 when EV$_i$ is positive (>0) and −1 when EV$_i$ is negative (<0).

Table 3 depicts a series of example entities, probabilities (P), relevance scores (ΔEV) and recalculated probabilities (P').

TABLE 3

Relevance Score (R) Calculation Examples

| Entity | Probability | EV | R Calculation | R |
|--------|-------------|------|-------------------------|-----------|
| A | p1 | +5 | p1' = p1 * (1 + log(5)) | 1.699 * p1 |
| B | p2 | −2 | p2' = p2/(1 + log(2)) | 0.769 * p2 |
| C | p3 | −100 | p3' = p3/(1 + log(100)) | 0.333 * p3 |
| D | p4 | 200 | p4' = p4 * (1 + log(200)) | 3.333 * p4 |
| E | p5 | 1000 | p5' = p5 * (1 + log(1000)) | 4.000 * p5 |

The relevance scores (R) can be used by the recommendation engine 520 to reorder the related entities. As illustrated in Table 3, big changes in the entity velocity can affect the relevance score used to determine the most relevant related entities, this feature assists in keeping recommendations on trend by using popularity to drive recommendation position. In the example illustrated in Table 3, entity E exhibits a dramatic rise in popularity (e.g., high positive EV), which translates into a relevance score that is four times entity E's probability. However, the example formula for calculating relevance prevents dramatic changes in popularity (e.g., EV) from distorting the relevance score by using a log scale. Other scaling factors can be used within alternative relevance score calculation formula to weigh popularity (or other factors relating entities within a system) more or less into entity probabilities in order to tailor results to a particular network-based publication system.

At 710, the method 700 can conclude with the recommendation engine 520 sending the most relevant related entities to the networked system 402 for display.

Example Edge Strength Data

FIG. 8 is a table illustrating an example of entity relationship data exhibiting high edge strength relationships, according to an example embodiment. FIG. 8 depicts example relationship data for an Apple iPhone. The edge strength column indicates that numerous related products exhibit triple digit edge strengths. In contrast, FIG. 9 is a table illustrating an example of entity relationship data exhibiting low edge strength relationships, according to an example embodiment. FIG. 9 depicts example relationship data for a Kindle (from Amazon.com). The edge strength column indicates that only a couple products have double digit edge strengths for this pivot product. With low edge strengths, which can result from limited navigation data for the pivot product, the potential recommendations can vary as shown in FIG. 9. In certain examples, the system can limit spurious results by forcing the edge strength, probability, or relevance score to be above a certain threshold.

Example User-Interface Screens

Figure 10A:
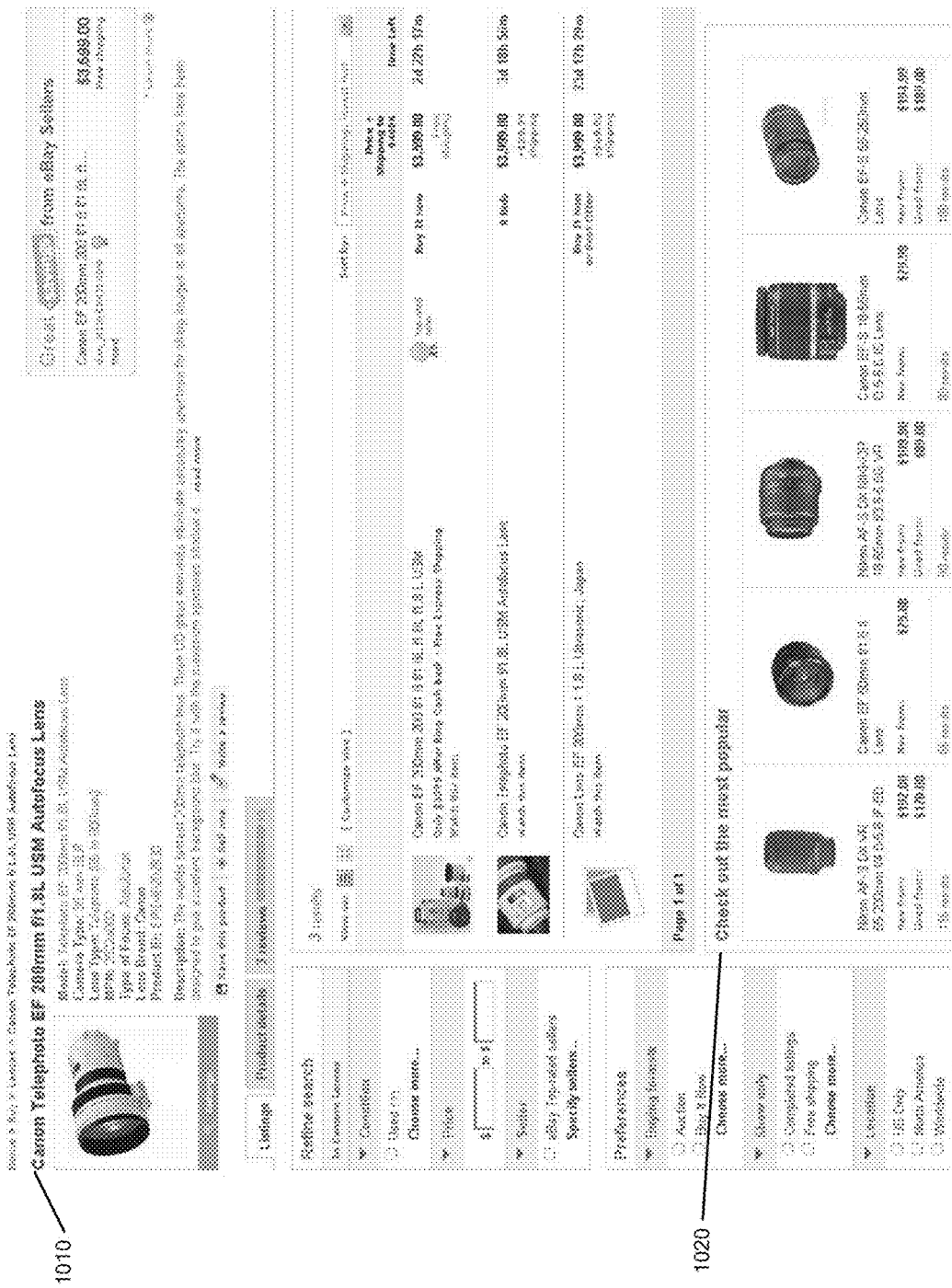
FIG. 10A is a user-interface screen illustrating example recommendations within a marketplace application without trend aware self-correcting entity relationship extraction.

FIG. 10A is a user-interface screen illustrating example recommendations within a marketplace application without trend aware self-correcting entity relationship extraction. FIG. 10A depicts a very expensive camera lens as a pivot product 1010 (pivot entity). A user searching for expensive camera equipment is unlikely to be interested in recommendations for inexpensive camera equipment, as shown in the recommendation section 1020. The example depicted in FIG. 10A illustrates the need for a trend aware self-correcting entity relationship recommendation methodology.

Figure 10B:
FIG. 10B is a user-interface screen illustrating example recommendations within a marketplace application with trend aware self-correcting entity relationship extraction, according to an example embodiment.
Figure 11A:
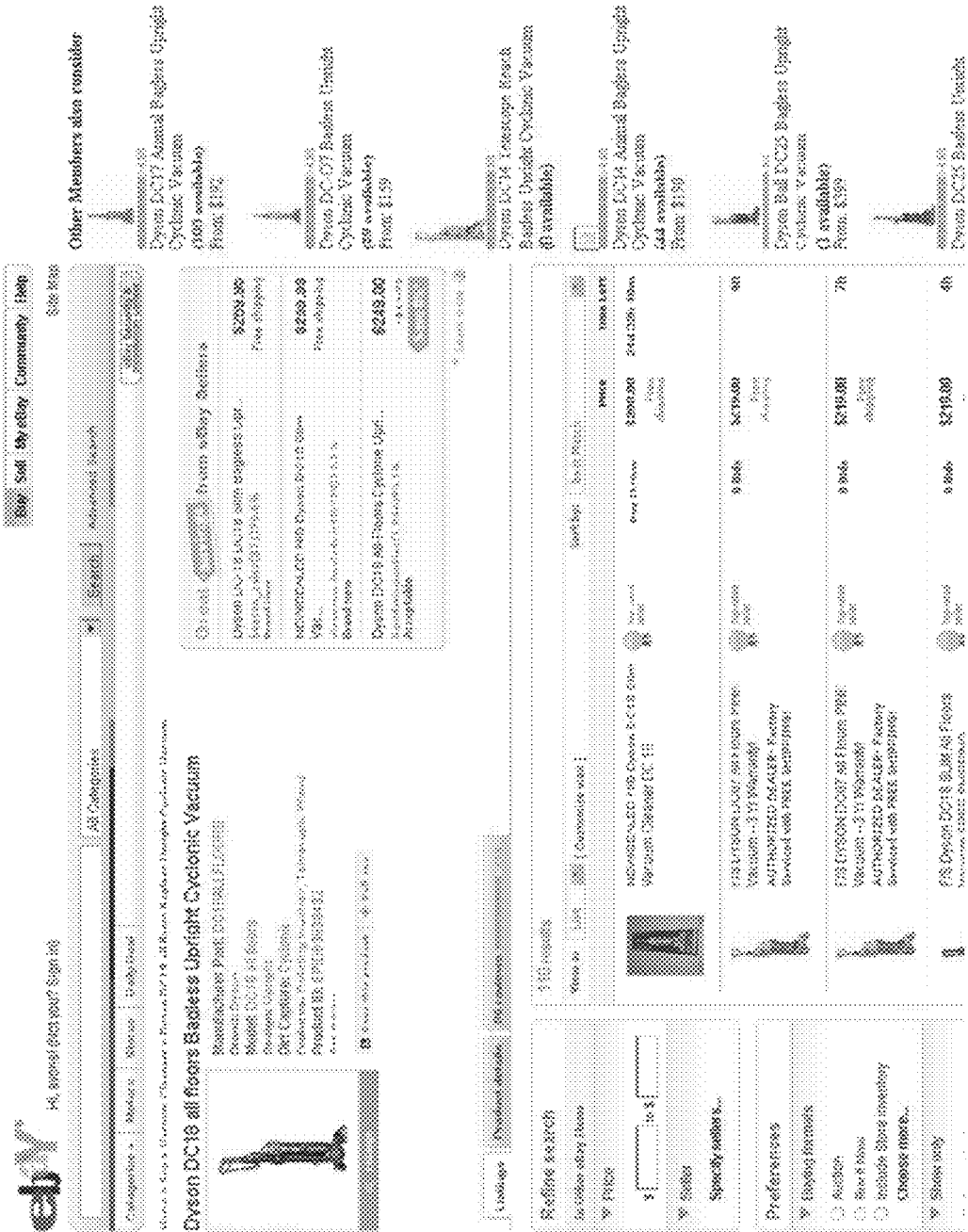
FIGS. 11A-11E are user-interface screens illustrating example displays of related entities, according example embodiments.
Figure 11B:
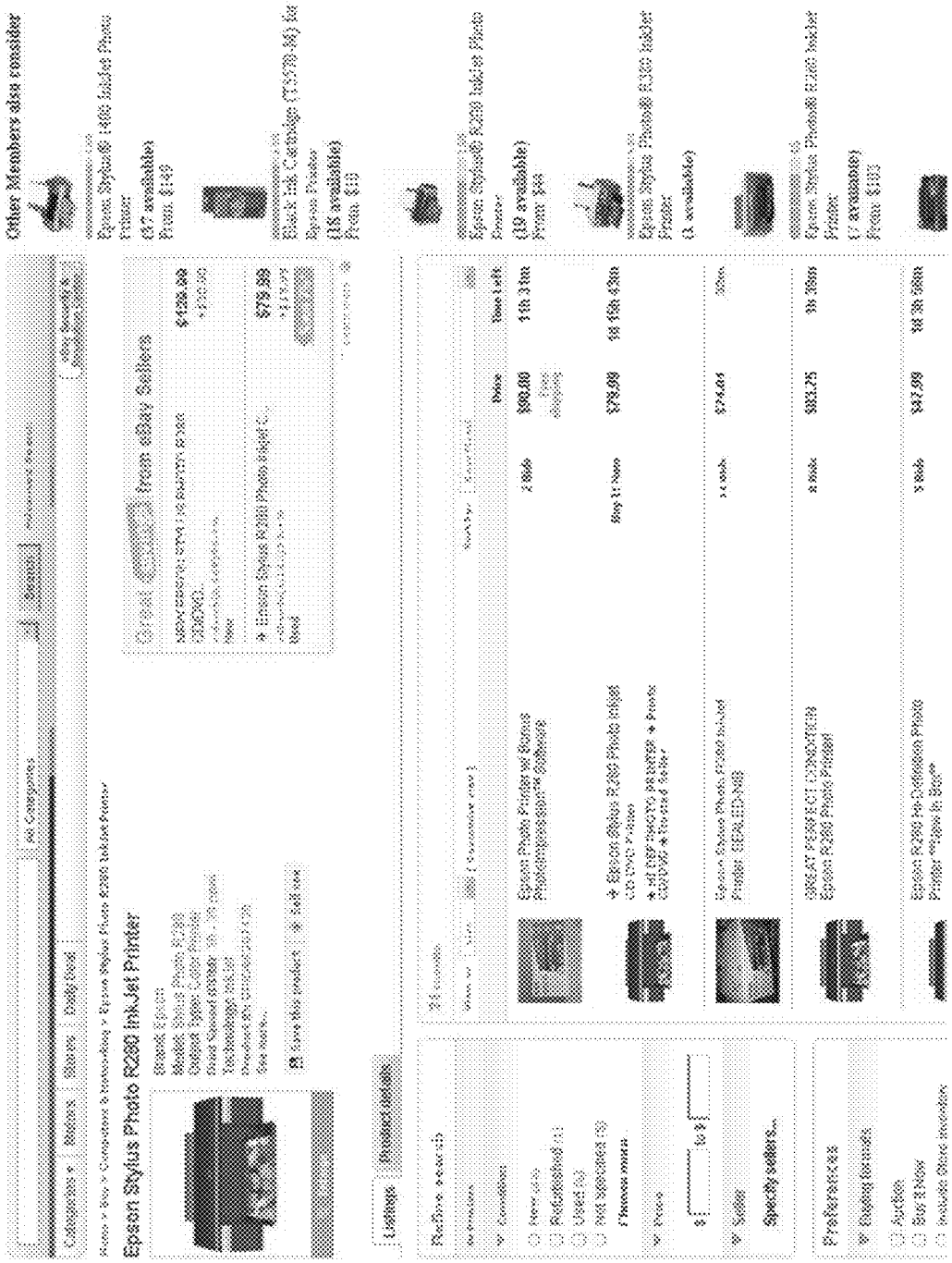
Figure 11C:
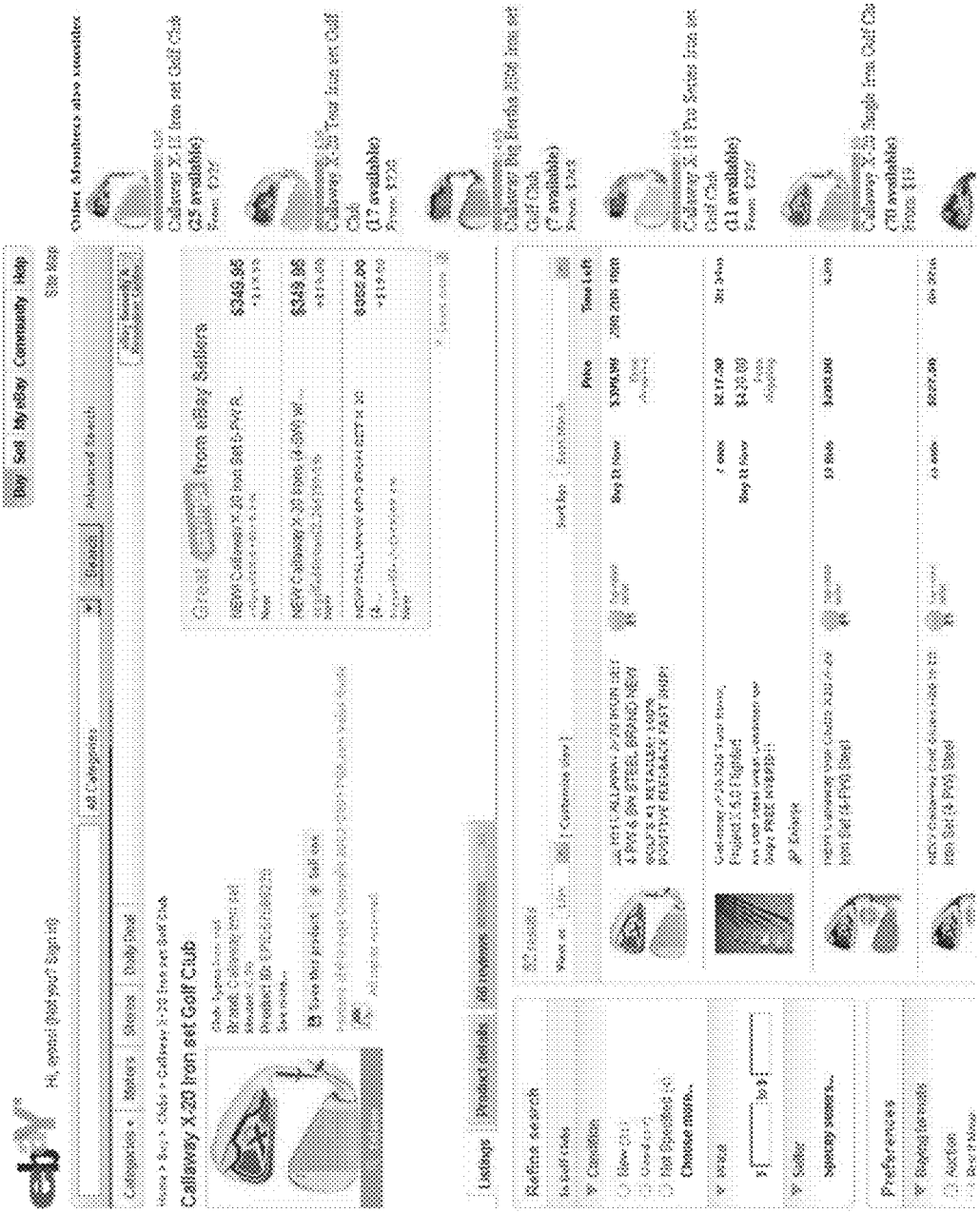
Figure 11D:
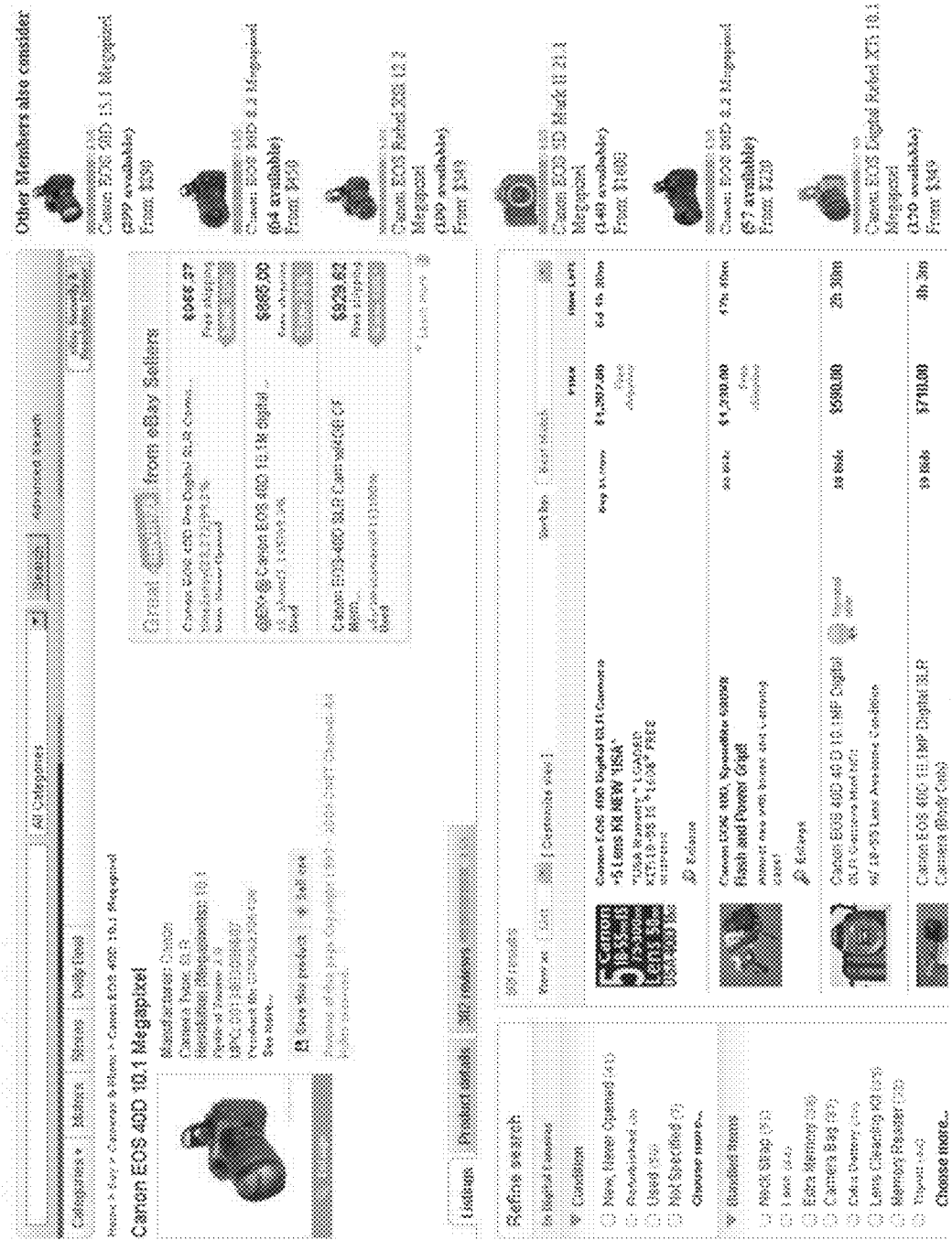
Figure 11E:
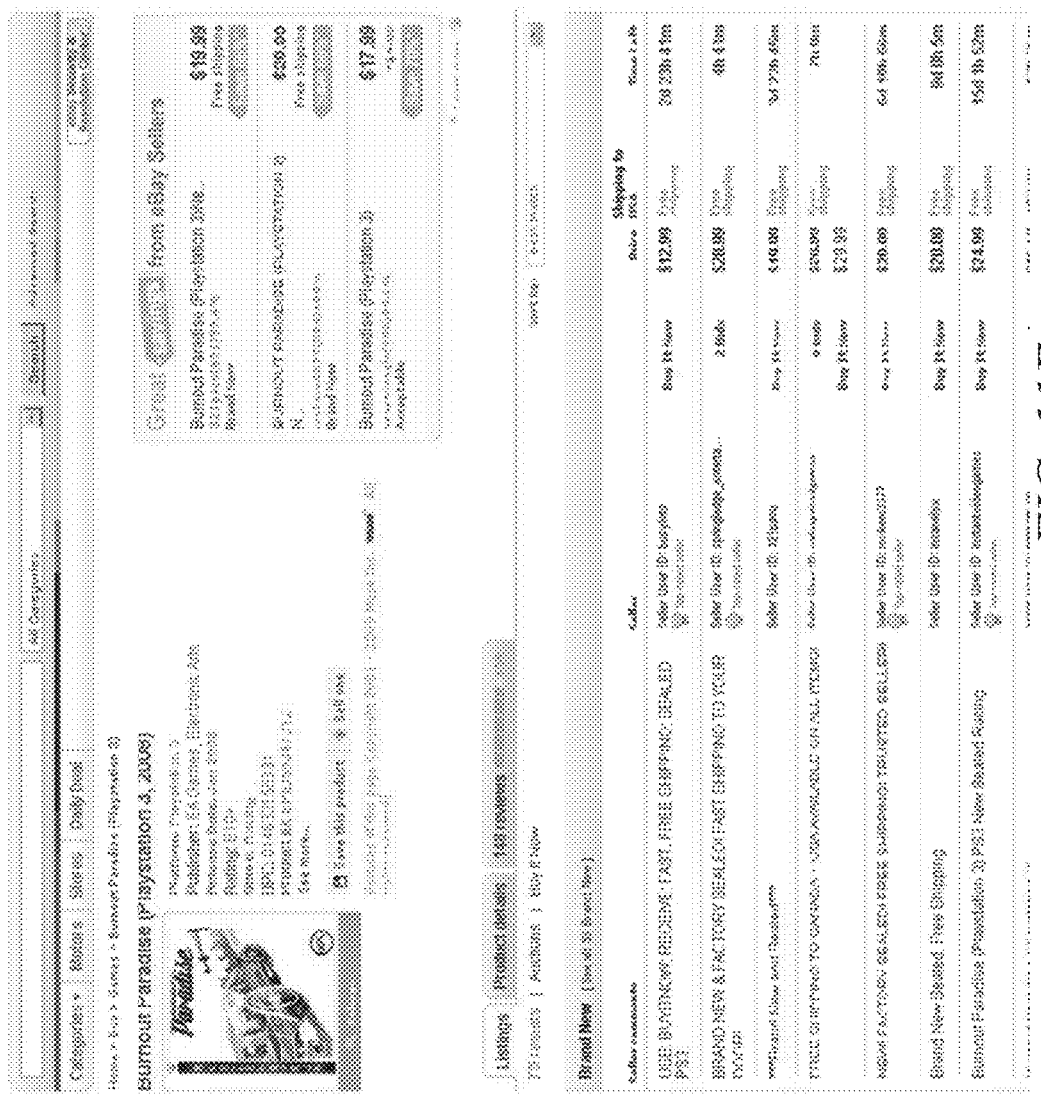

FIG. 10B is a user-interface screen illustrating example recommendations within a marketplace application with trend aware self-correcting entity relationship extraction, according to an example embodiment. FIG. 10B depicts the same expensive camera lens as the pivot product (pivot entity). However, the recommendation section 1020, depicts a series of similar lenses available within the example marketplace. FIG. 10B illustrates the potential value of using the trend aware self-correcting entity relationship extraction recommendation methodology.

FIGS. 11A-11E are user-interface screens illustrating example displays of related entities, according example embodiments. Each of the user-interface screen examples depicts a pivot product within the body of the screen and a list of recommendations along the right-hand edge (under the Other Members also consider heading). The example user-interface screens depict a network-based marketplace application, but could also depict any network-based publication system.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
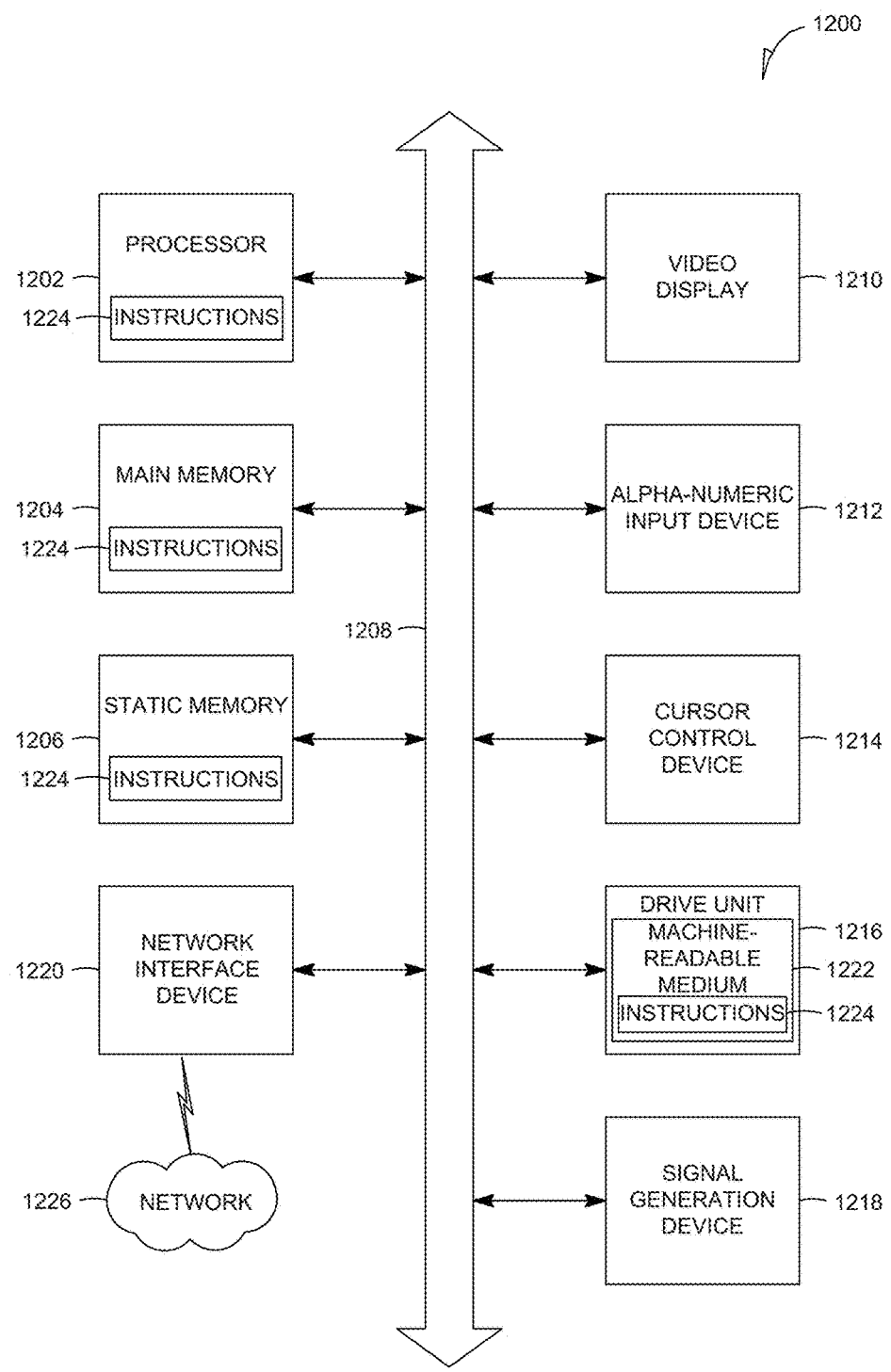
FIG. 12 is a diagrammatic representation of a machine in the example form of a computer system within which a set of instructions for causing the machine to perform any one or more of the methodologies discussed herein may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of instructions and data structures (e.g., software) 1224 embodying or used by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first, " "second," and "third, " etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The claimed invention is:

1. A method comprising:
   receiving a selected entity on a network-based transaction system;
   retrieving a first navigation trail of the selected entity, the first navigation trail including a first log of transitions between content located within the network-based transaction system, the content including any individually addressable portion of the network-based transaction system;
   extracting the first log of transitions from the first navigation trail to a first data table at a database;
   retrieving a second navigation trail of a second entity, the second navigation trail including a second log of transitions;
   extracting the second log of transitions from the second navigation trail to a second data table at the database;
   calculating an edge strength between the selected entity and the second entity, the edge strength calculated based on the first log of transitions of the first data table and the second log of transitions of the second data table; and
   causing display of a recommendation of the second entity based on the calculated edge strength.

2. The method of claim 1, wherein the calculating the edge strength between the selected entity and the second entity includes:
   determining an amount of navigation between the selected entity and the second entity.

3. The method of claim 2, wherein the determining the amount of navigation between the selected entity and the second entity includes:
   determining user session boundaries for determining related navigation history.

4. The method of claim 1, wherein the method further comprises calculating a relevance score for the second entity, and wherein the calculating the relevance score includes:
   determining a visitation rate of the second entity;
   calculating a change in the visitation rate of a period of time, the change in the visitation rate based on the visitation rate and a previous visitation rate;
   calculating an entity velocity of the second entity based on the change in the visitation rate; and
   calculating the relevance score based on the entity velocity.

5. The method of claim 1, wherein the retrieving the second navigation trail of the second entity includes:
   determining a plurality of related entities based at least in part on aggregated navigation transitions between the selected entity and each related entity of the plurality of related entities, the plurality of related entities including the second entity.

6. The method of claim 5, further comprising:
   selecting, from among the plurality of related entities, the second entity based at least in part on a probability calculated based on the aggregated navigation transitions.

7. The method of claim 1, further comprising:
   aggregating navigation transition between entities, wherein the navigation transitions include the first navigation trail and the second navigation trail.

8. A system comprising:
   processors; and
   a memory storing instructions that, when executed by at least one processor among the processors, causes the system to perform operations comprising:
   receiving a selected entity on a network-based transaction system;
   retrieving a first navigation trail of the selected entity, the first navigation trail including a first log of transitions between content located within the network-based transaction system, the content including any individually addressable portion of the network-based transaction system;
   extracting the first log of transitions from the first navigation trail to a first data table at a database;
   retrieving a second navigation trail of a second entity, the second navigation trail including a second log of transitions;
   extracting the second log of transitions from the second navigation trail to a second data table at the database;
   calculating an edge strength between the selected entity and the second entity, the edge strength calculated based on the first log of transitions the first data table and the second log of transitions of the second data table; and
   causing display of a recommendation of the second entity based on the calculated edge strength.

9. The system of claim 8, wherein the operations for calculating the edge strength between the selected entity and the second entity further comprise:
  determining an amount of navigation between the selected entity and the second entity.

10. The system of claim 9, wherein the operations for determining the amount of navigation between the selected entity and the second entity include:
  determining user session boundaries for determining related navigation history.

11. The system of claim 8, wherein the operations further comprise:
  calculating a relevance score for the second entity, and wherein the calculating the relevance score includes:
  determining a visitation rate of the second entity;
  calculating a change in the visitation rate of a period of time, the change in the visitation rate based on the visitation rate and a previous visitation rate;
  calculating an entity velocity of the second entity based on the change in the visitation rate; and
  calculating the relevance score based on the entity velocity.

12. The system of claim 8, wherein the operations for retrieving the second navigation trail of the second entity comprise:
  determining a plurality of related entities based at least in part on aggregated navigation transitions between the selected entity and each related entity of the plurality of related entities, the plurality of related entities including the second entity.

13. The system of claim 12, wherein the operations further comprise:
  selecting, from among the plurality of related entities, the second entity based at least in part on a probability calculated based on the aggregated navigation transitions.

14. The system of claim 8, wherein the operations further comprise:
  aggregating navigation transition between entities, wherein the navigation transitions include the first navigation trail and the second navigation trail.

15. A non-transitory machine-readable storage medium comprising instructions that, when executed by one or more processors of a machine, cause the machine to perform operations comprising:
  receiving a selected entity on a network-based transaction system;
  retrieving a first navigation trail of the selected entity, the first navigation trail including a first log of transitions between content located within the network-based transaction system, the content including any individually addressable portion of the network-based transaction system;
  extracting the first log of transitions from the first navigation trail to a first data table at a database;
  retrieving a second navigation trail of a second entity, the second navigation trail including a second log of transitions;
  extracting the second log of transitions from the second navigation trail to a second data table at the database;
  calculating an edge strength between the selected entity and the second entity, the edge strength calculated based on the first log of transitions of the first data table and the second log of transitions of the second data table; and
  causing display of a recommendation of the second entity based on the calculated edge strength.

16. The non-transitory machine-readable storage medium of claim 15, wherein the instructions for the calculating the edge strength between the selected entity and the second entity include instructions that cause the machine to perform operations further comprising:
  determining an amount of navigation between the selected entity and the second entity.

17. The non-transitory machine-readable storage medium of claim 16, wherein instructions for the determining the amount of navigation between the selected entity and the second entity include instructions that cause the machine to perform operations further comprising:
  determining user session boundaries for determining related navigation history.

18. The non-transitory machine-readable storage medium of claim 15, further comprising instructions that cause the system to perform operations comprising:
  calculating a relevance score for the second entity, and wherein the calculating the relevance score includes:
  determining a visitation rate of the second entity;
  calculating a change in the visitation rate of a period of time, the change in the visitation rate based on the visitation rate and a previous visitation rate;
  calculating an entity velocity of the second entity based on the change in the visitation rate; and
  calculating the relevance score based on the entity velocity.

19. The non-transitory machine-readable storage medium of claim 15, wherein the instructions for the retrieving the second navigation trail of the second entity cause the system to perform operations further comprising:
  determining a plurality of related entities based at least in part on aggregated navigation transitions between the selected entity and each related entity of the plurality of related entities, the plurality of related entities including the second entity.

20. The non-transitory machine-readable storage medium of claim 19, further comprising instructions that cause the system to perform operations further comprising: selecting, from among the plurality of related entities, the second entity based at least in part on a probability calculated based on the aggregated navigation transitions.

* * * * *